United States Patent [19]

McKeag

[11] Patent Number: 4,634,171

[45] Date of Patent: Jan. 6, 1987

[54] AUTOMOBILE HARD TOP CONVERTIBLE

[75] Inventor: William E. McKeag, Cassoplois, Mich.

[73] Assignee: D-M Design Corp., Elkhart, Ind.

[21] Appl. No.: 605,630

[22] Filed: Apr. 30, 1984

Related U.S. Application Data

[63] Continuation-in-part of Ser. No. 389,680, Jun. 18, 1982, abandoned.

[51] Int. Cl.[4] .............................................. B60J 7/08
[52] U.S. Cl. ..................................... 296/108; 296/117
[58] Field of Search ............... 296/107, 108, 111, 117, 296/76

[56] References Cited

U.S. PATENT DOCUMENTS

| 2,471,378 | 5/1949 | Shilala | 296/107 |
| 2,768,024 | 10/1956 | Spears et al. | 296/107 |
| 2,768,857 | 10/1956 | Albrecht | 296/107 |
| 2,939,742 | 6/1960 | Dardarian et al. | 296/107 |
| 3,180,677 | 4/1965 | Scott | 296/107 |
| 3,909,060 | 9/1975 | Katayama | 296/76 |

FOREIGN PATENT DOCUMENTS 733380 10/1932 France ................ 296/107

Primary Examiner—Robert R. Song
Attorney, Agent, or Firm—Thomas J. Dodd; James D. Hall

[57] ABSTRACT

A motor vehicle in conjunction with a removable hard top connected to a frame cage. The trunk lid of the vehicle is rearwardly hinged, such that it may be rasied from its front portion towards the rear of the vehicle. While the trunk lid is raised, the top may be rotated about the frame cage so that it rests within the trunk of the vehicle.

6 Claims, 10 Drawing Figures

AUTOMOBILE HARD TOP CONVERTIBLE

CROSS-REFERENCE TO RELATED APPLICATIONS

This application is a continuation-in-part of application Ser. No. 389,680, filed June 18, 1982, now abandoned.

SUMMARY OF THE INVENTION

This invention relates to a motor vehicle with a rigid, removable top.

Vehicles with removable tops are commonly referred to as convertibles. Heretofore, such tops were usually made of flexible material, which allowed the top to be easily folded between open and closed positions. Unfortunately, flexible tops are inherently weak in many aspects. They provide only a modicum of support from external forces, are subject to rapid deterioration, frequently develop leaks, and are very poor insulators.

Hard tops on the other hand possess excellent properties of insulation, water sealing and durability, but are often impractical due to the weight of the top which makes removal very difficult for the average person. Also, some removable hard tops have been hinged to accommodate storage behind the rear seat. This invention provides for a removable hard top in connection with a frame cage mechanism which allows for the easy and rapid adjustment of the top between open and closed positions. The top is pivotally connected to the cage mechanism, allowing the user to easily rotate the top between open and closed positions. The trunk lid of the vehicle is rearwardly hinged so that it opens toward the rear of the vehicle, allowing free space for the rotation of the top into the trunk compartment, where the top is stored when in its open position.

Accordingly, it is an object of this invention to provide for a new and novel type of convertible motor vehicle.

Another object of this invention is to provide for a convertible motor vehicle whose top possesses excellent properties of insulation, durability, and support.

Another object of this invention is to provide for a convertible vehicle which is aesthetically pleasing to the eye.

Still another object of this invention is to provide for a convertible vehicle whose top is simple and which efficiently converts from open to closed positions.

Other objects of the invention will become apparent upon a reading of the following description.

DESCRIPTION OF THE PREFERRED EMBODIMENTS

Figure 1:
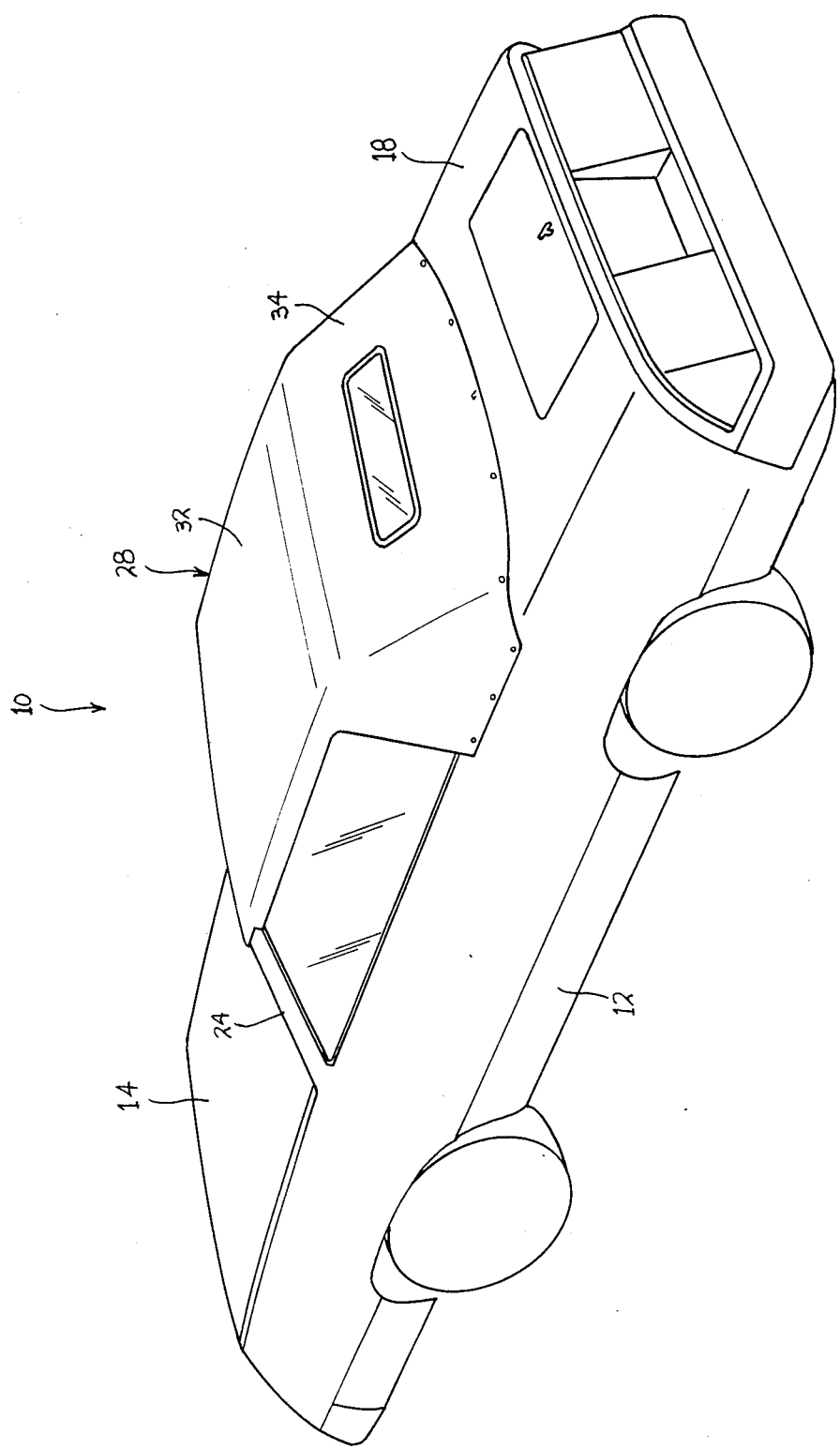
FIG. 1 is a perspective view of the convertible vehicle with the top in its closed position.

The preferred embodiments illustrated are not intended to be exhaustive or to limit the invention to the precise forms disclosed. They are chosen and described to explain the principles of their invention and its application and practical use to thereby enable others skilled in the art to utilize the invention.

The convertible vehicle 10 of this invention includes a standard vehicle body 12. Body 12 consists of an engine compartment covered by a hood 14, and a trunk 16 overlaid by a trunk lid 18. A passenger compartment 20 is located between the engine compartment and trunk 16 and includes seats 22 for passengers. An upstanding windshield 24 is located at the front of compartment 20. Trunk 16 includes a floor which extends rearwardly from its low section 26 behind compartment 20 to its high section 27 in the trunk.

Figure 2:
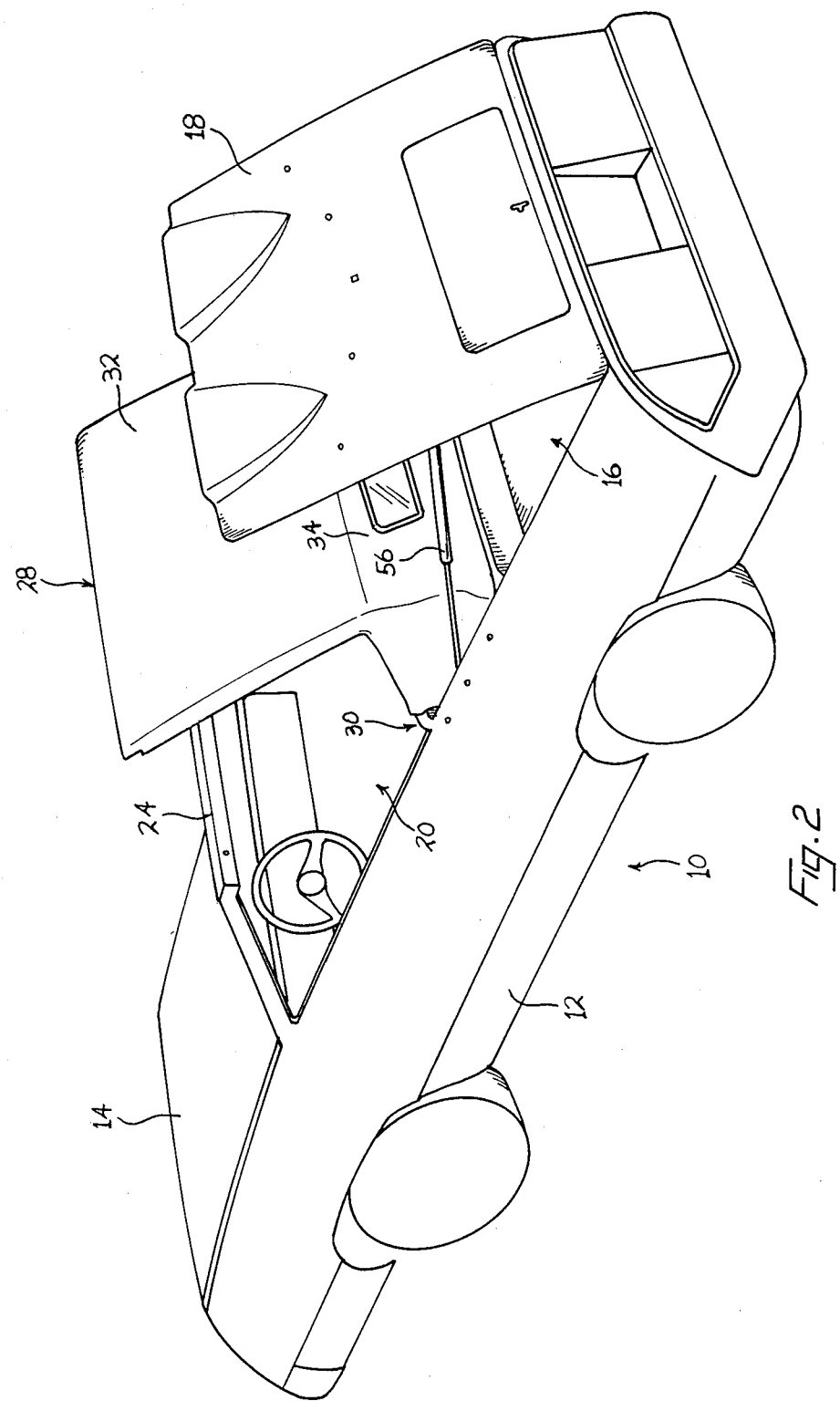
FIG. 2 is a perspective view of the convertible vehicle with the top in a half-open position and the trunk lid raised for purposes of illustration.
Figure 3:
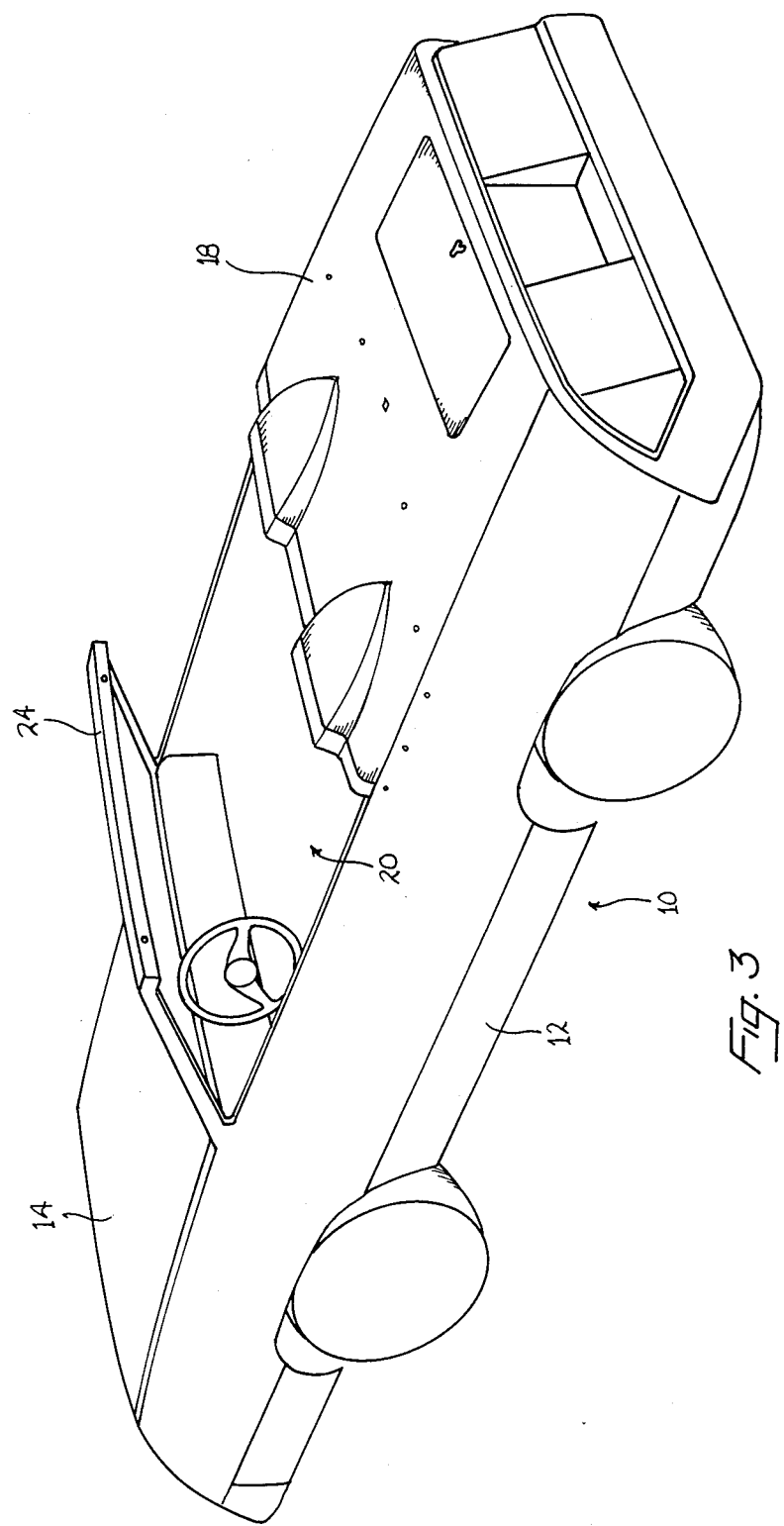
FIG. 3 is a perspective view of the convertible vehicle with the top in its open position.
Figure 4:
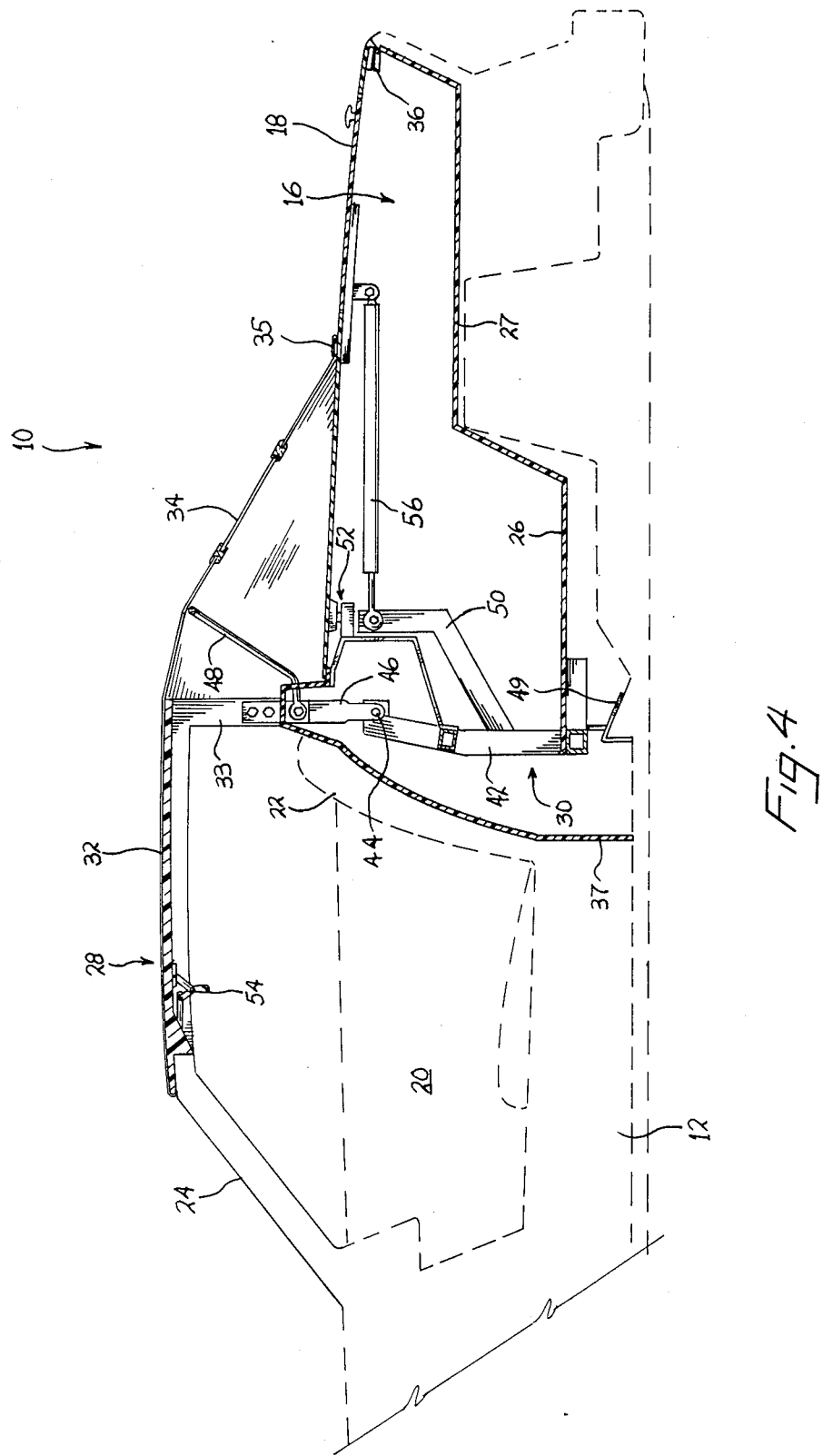
FIG. 4 is a fragmentary sectional view of the convertible vehicle with one embodiment of the top in its closed position, the top and its components thereof being depicted in solid line form.
Figure 5:
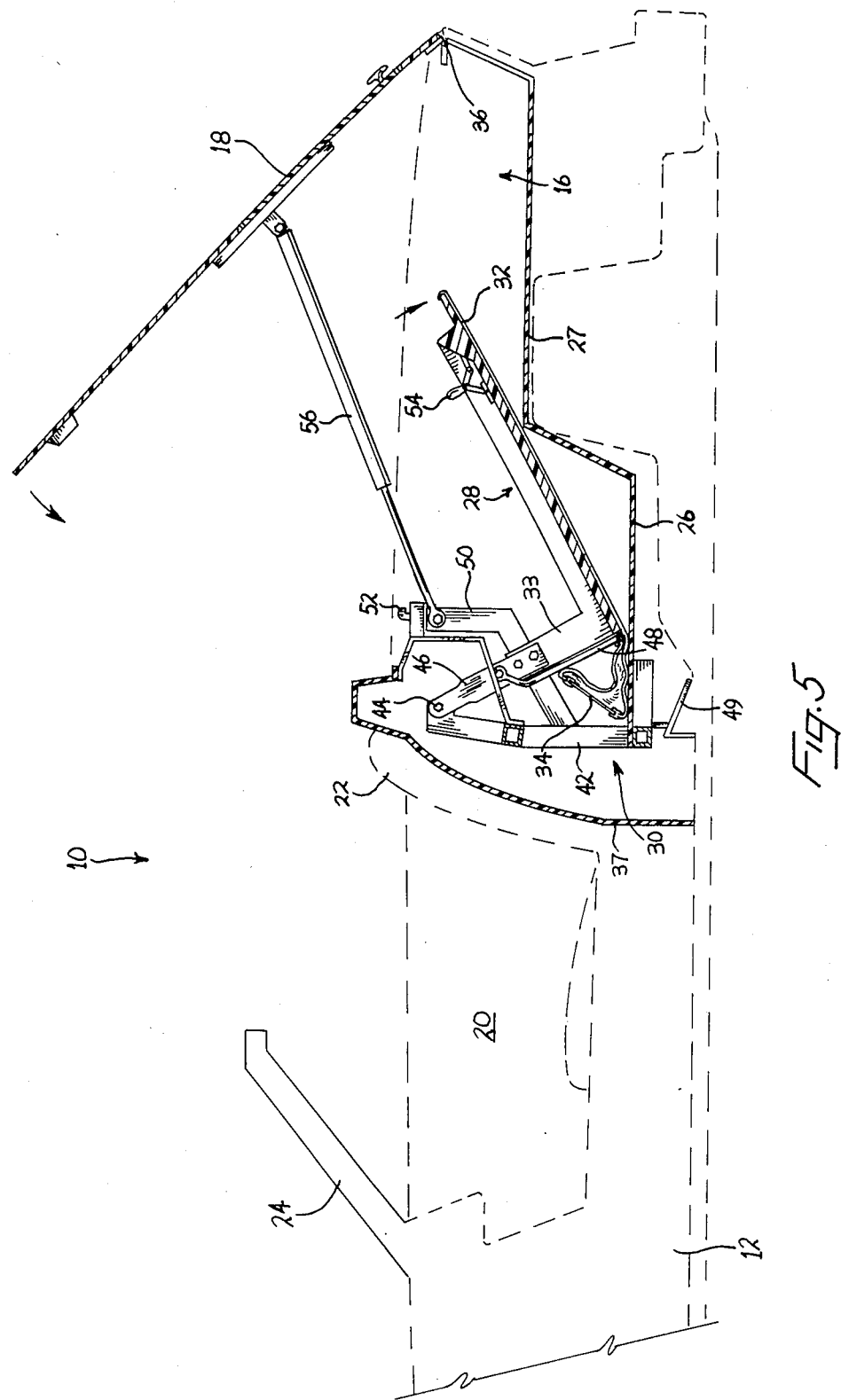
FIG. 5 is a fragmentary sectional view of the convertible vehicle of FIG. 4 with the top in its open position.

Vehicle 10, shown in conjunction with its novel top concept in FIGS. 1-3, includes a removable top 28, supported by a frame cage 30. Top 28 includes a rigid overhead component 32 and a flexible rear window component 34. Top overhead component 32 includes spaced depending legs 33 located adjacent the top's rear window component 34. Top overhead component 32 may be formed of fiberglass covered by a vinyl or canvas covering with rear window component 34 being an extension of the vinyl or canvas covering. Legs 33 of the top overhead component are pivotally connected to frame cage 30 so that top 28 is rotatable between the full closed position as shown in FIGS. 1 and 4 with the front of the top engaging windshield 24 and being connected by snaps 35 to body 12 at its rear window component 34, and the full open position as shown in FIGS. 3 and 5. Trunk lid 18 of vehicle 10 is hinged at 36 to the rear of vehicle body 12. Lid 18 is raisable in a rearward direction opening towards the front of vehicle 10 to allow top 28 to be pivoted into and stored within trunk 16.

Figure 6:
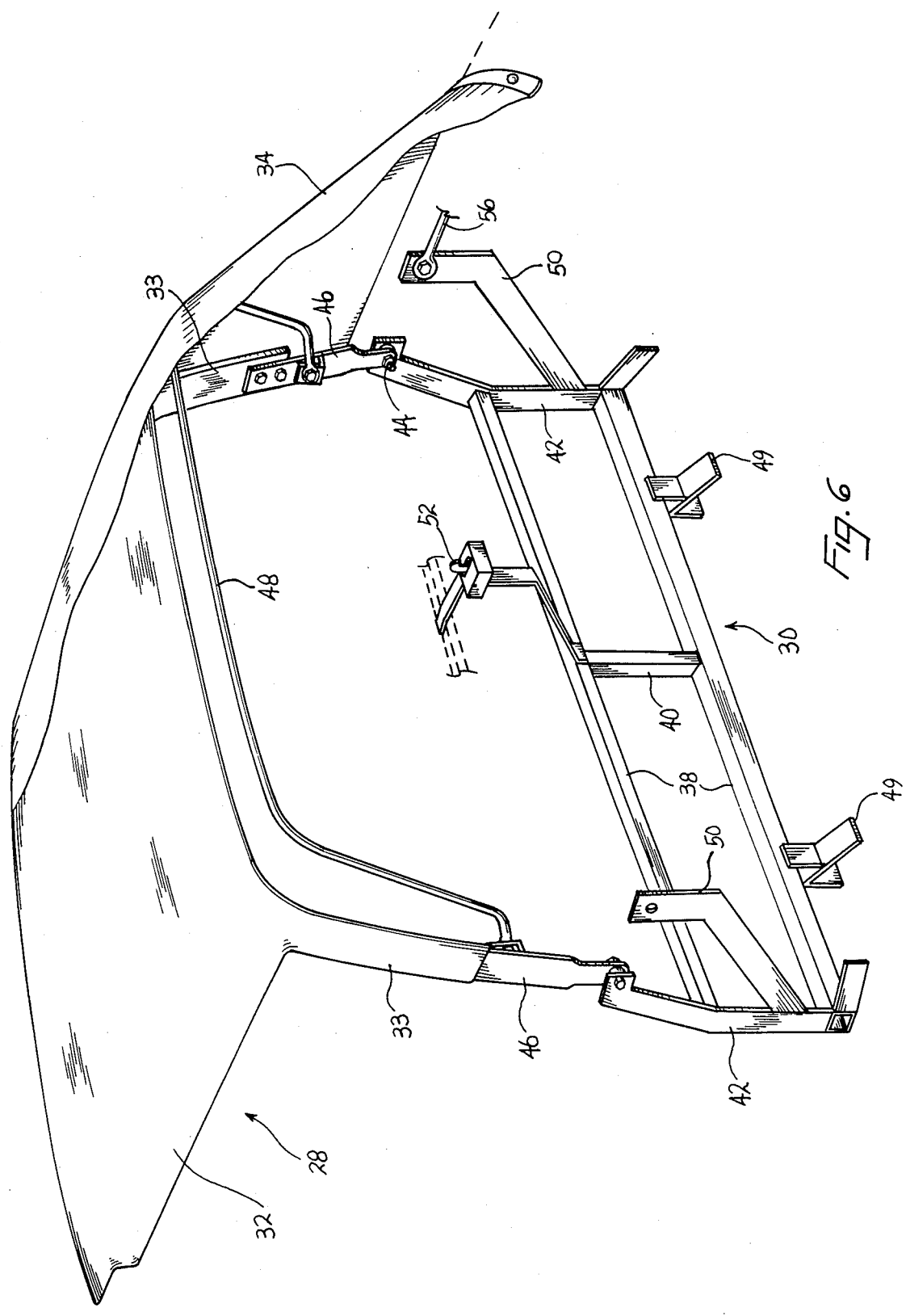
FIG. 6 is a fragmentary perspective view of the frame cage mechanism for the vehicle of FIG. 4 with the top attached.
Figure 7:
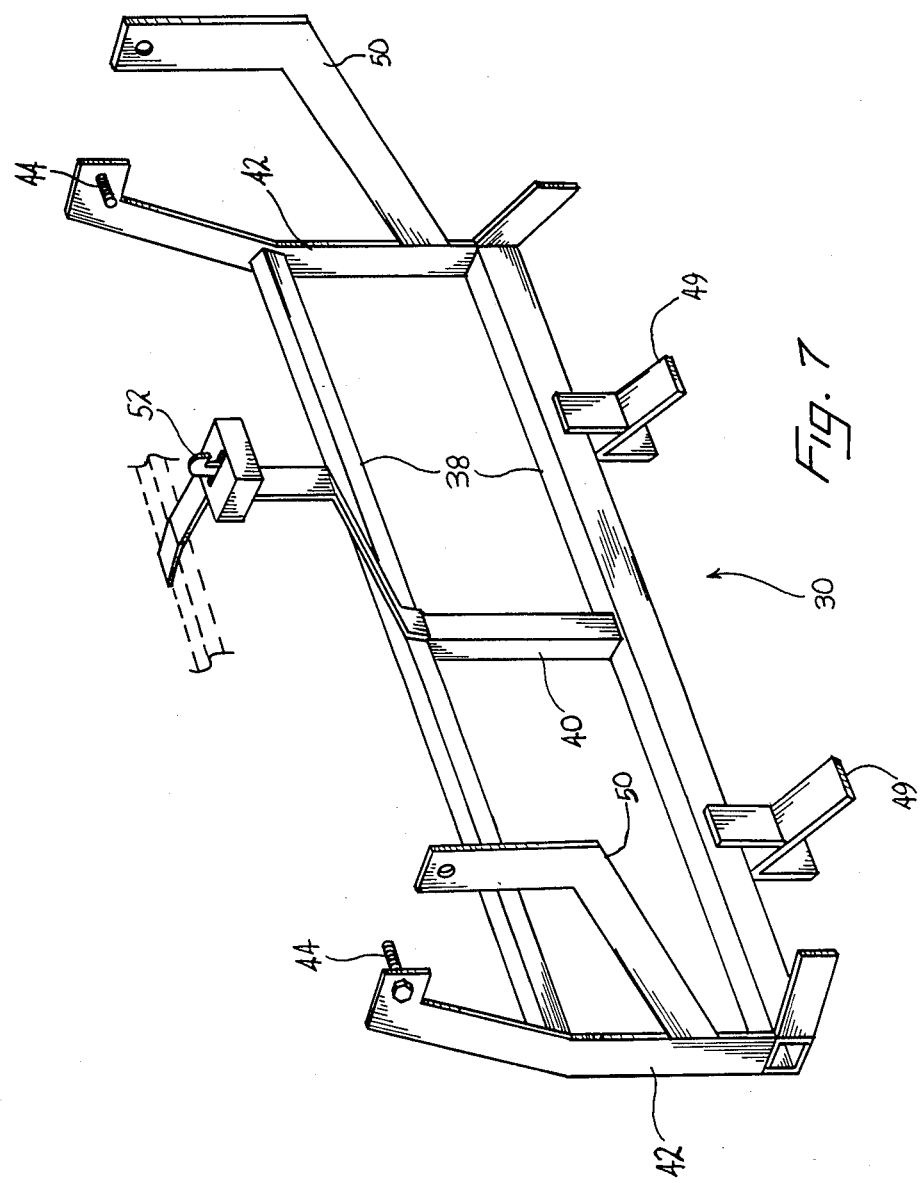
FIG. 7 is a fragmentary perspective view of the frame cage mechanism of FIG. 6.

Frame cage 30, as seen in detail in FIGS. 6 and 7, is located behind partition 37 in back of seats 22 and includes two horizontal bars 38 separated by a vertical center post 40, and two vertical end members 42. Each end member 42 extends above upper bar 38 and is pivotally connected by a bolt 44 to a support arm 46. Each arm 46 is secured to a leg 33 of top 28 and serves as a pivotal support for the top. A pivotal support rod 48 is attached between arms 46 to provide support for window component 34 when top 28 is in its closed position. Cage 30 is suitably secured to body 12 of vehicle 10, such as at brackets 49. An L-shaped support bar 50 extends rearwardly and upwardly from each frame cage 30 and serves to pivotally support a cylinder 56 attached to trunk lid 18.

Each cylinder 56 is also connected to trunk lid 18 so that the cylinder expands and contracts according to the movement of the lid. Cylinders 56 serve to force the trunk lid open when the lid is released from latch 52 and allow easy opening and cushioned closing of the lid.

To convert vehicle 10 from closed top to open top, the driver first undoes snaps 35 and folds top window component 34 forward. He then unlocks and raises trunk lid 18. Latch members 54 which fasten top 28 to windshield 24 are then released. Top 28 is then rotated about cage bolts 44 until its overhead component 32 is rested upon trunk floor high section 27 with top window component 34 folded over trunk floor low section 26. Trunk lid 18 is then closed. To raise top 28, the reverse of the above described procedure is followed.

Figure 8:
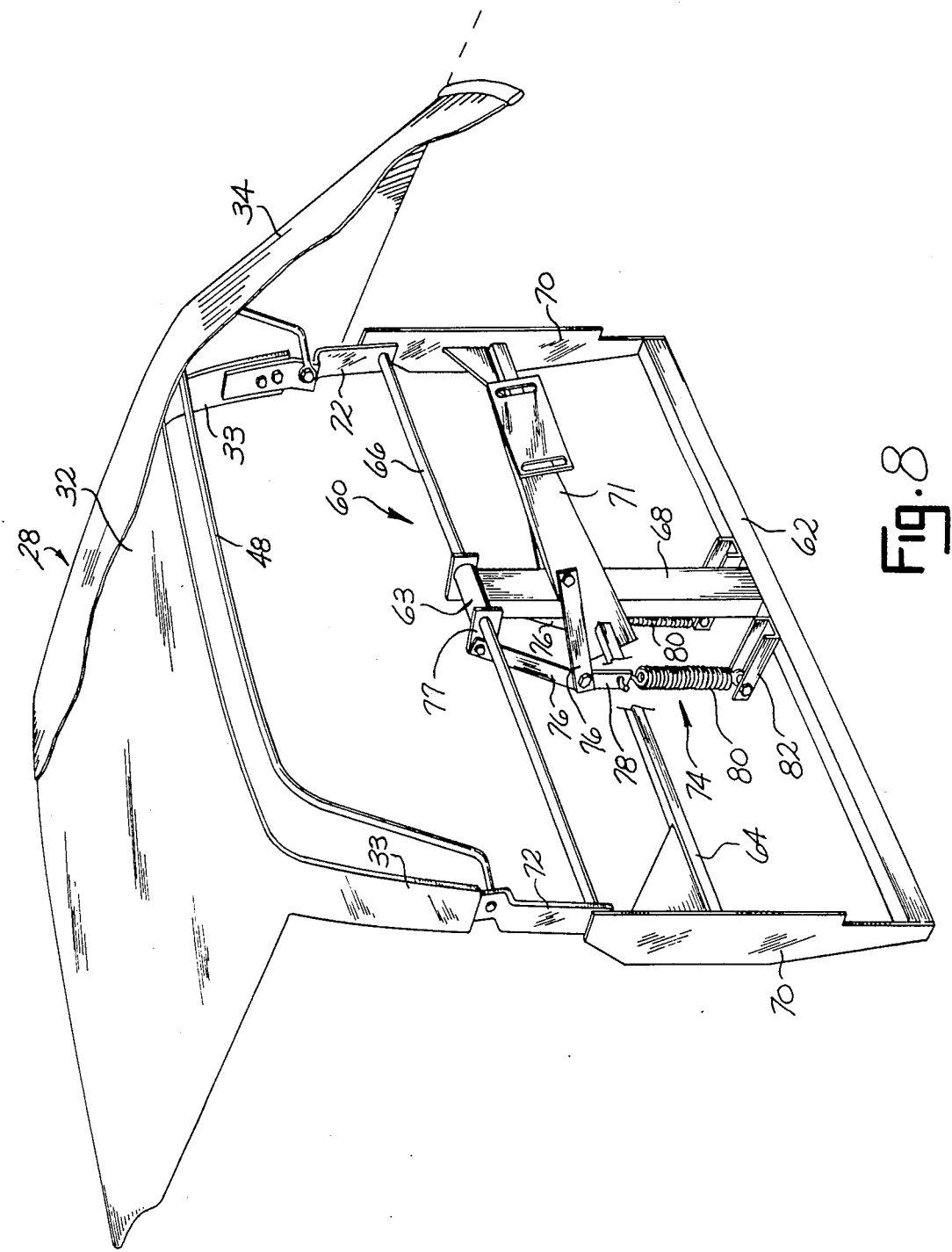
FIG. 8 is a fragmentary perspective view of a modified cage mechanism shown in the top in its closed position.
Figure 9:
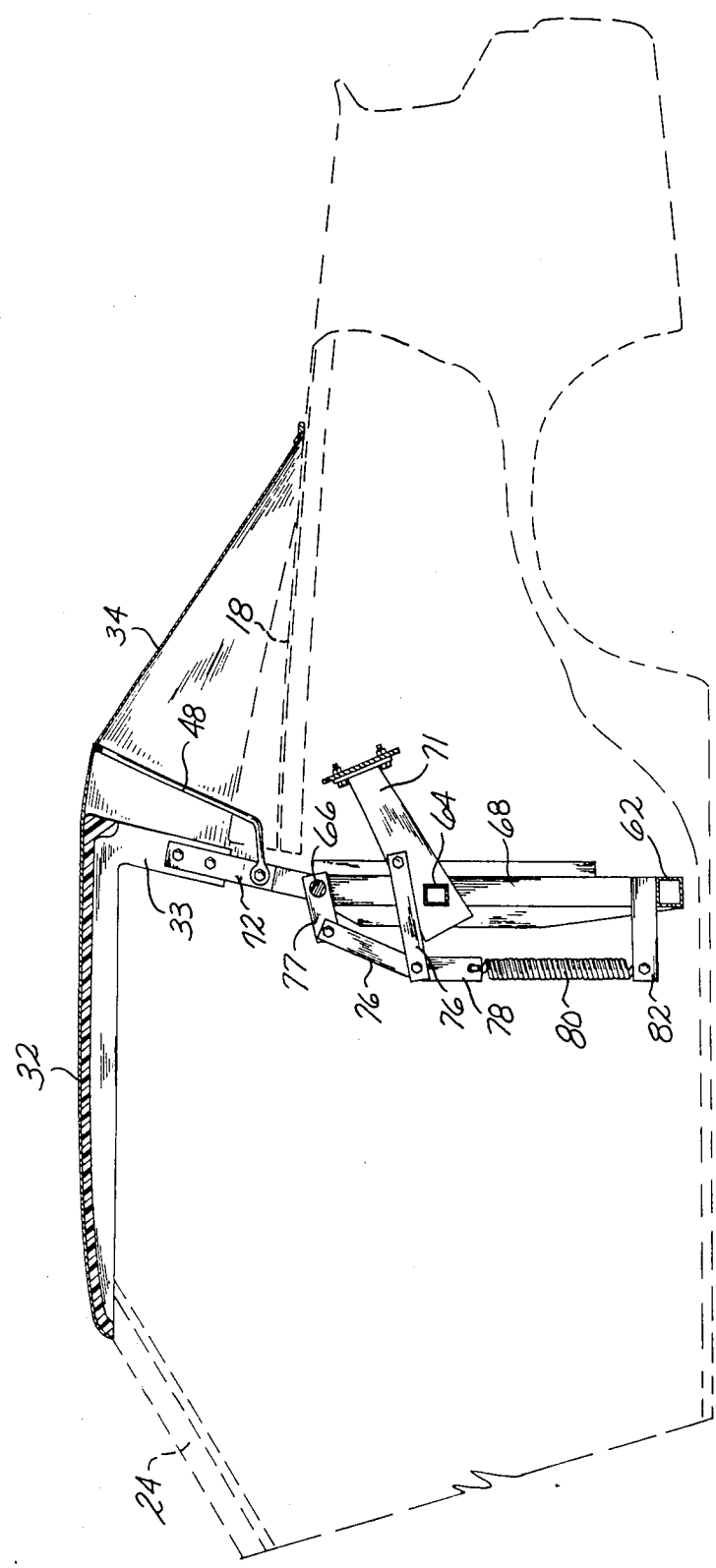
FIG. 9 is a fragmentary sectional view of the top of FIG. 8 shown in the closed position.
Figure 10:
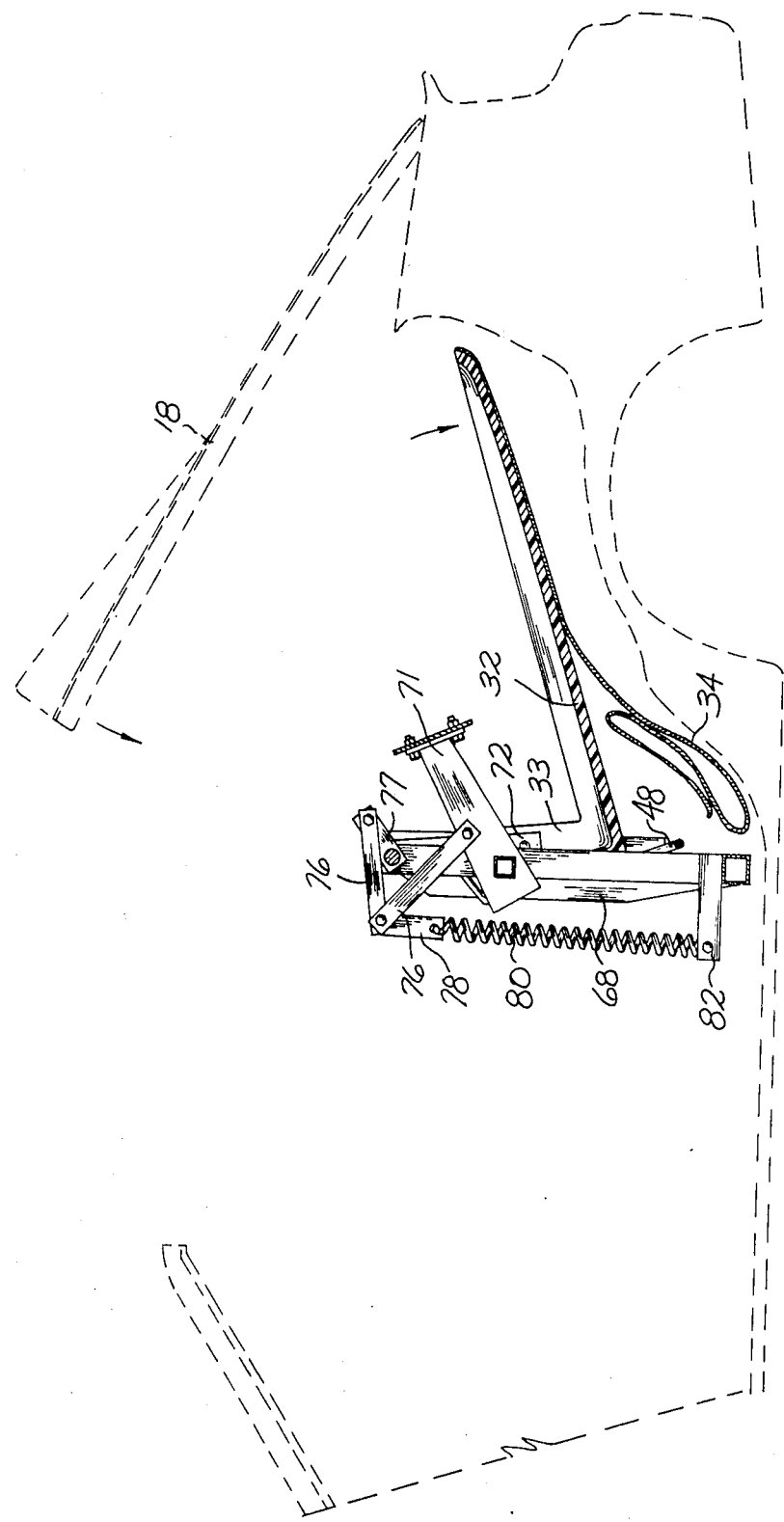
FIG. 10 is a fragmentary sectional view of the top of FIG. 8 shown advancing into its open position.

A modified cage construction 60 is shown in FIGS. 8-10. Cage 60 is positioned behind seats 22 in the same manner as cage 30 of FIGS. 4-7 and includes two vertical oriented horizontal bars 62 and 64 separated by vertical center post 68 and two vertical end members 70. A horizontal pivot rod 66 is rotatably connected to end members 70 and extends rotatably through a sleeve 63 of center post 68. An extension 71 projects rearwardly from center post 68 for accommodating a latch (not shown) for securing the trunk lid 18 closed. A support arm 72 is fixedly connected to bar 66 adjacent each end member 70. Each support arm 72 is secured to a top leg 33 and provides pivotal support for top 32 about rod 66. Also associated with rod 66 is a counterbalance 74, which includes a pair of links 76 extending forwardly on each side of center post 68. Each pair of links 76 are pivotally joined at corressponding ends. The opposite ends of each pair of links 76 are pivotally joined to extension 71 and to an arm 77 fixedly connected to bar 66 so that raising and lowering movement of top 28 and the resultant rotation of rod 66 will cause the lowering and raising movement of the pivotally joined ends of each pair of links 76. An attachment link 78 is pivotally connected to the pivotally joined ends of each pair of links 76. A helical spring 80 extends between each link 78 and a foot 82 attached to lower bar 62. Each spring 80 is placed in tension when top 28 is lowered into its open position. Brackets (not shown) may be attached to lower bar 62 to receive attachment members for securing cage 60 to the vehicle body in the same fashion as shown with bracket 49 of cage 30.

Cage 60 operates similarly to cage 30. As top 32 is pivoted into a selected open or position, springs 80 serve to bias movement of the top, facilitating ease in pivoting the top between its open and closed positions. Springs help urge the top into its closed position and cushion or retard free movement of the top into its open position.

It is to be understood that the invention is not to be limited to the preceding description, but may be modified within the scope of the appended claims.

What I claim is:

1. A motor vehicle in combination with a removable top, said vehicle comprising a body having a rearwardly hinged trunk lid, said trunk lid being raisable towards the rear of said vehicle to reveal a storage compartment located therein, an upstanding windshield at a front portion of the body of said vehicle, a passenger compartment located generally between said storage compartment and said windshield, said top including a rigid overhead component for overlying said passenger compartment, a frame cage located behind said passenger compartment, said frame cage having spaced vertical end members, said top overhead component being pivotally connected at its rear end portion to said frame cage end members, wherein said top is rotatable with said trunk lid opened between an open position in which the top rests within said storage compartment and a closed position in which said overhead component of the top overlies said passenger compartment of the vehicle and is supported thereover by said windshield and cage, said trunk lid adapted to overlie said top in a closed orientation when the top is in its open position, said top including a flexible rear window component extending from said rear end portion of the top overhead component, means for releasably securing said top rear window component to said vehicle body when the top is in its said closed position.

2. The vehicle of claim 1 wherein said storage compartment includes a lower wall component, said top at its overhead component resting upon and supported by said lower wall component when the top is in its said open position.

3. The vehicle of claim 1 and means connected between said cage and trunk lid for yieldably urging the trunk lid open.

4. The vehicle of claim 1 wherein said motor vehicle is an automobile.

5. The vehicle of claim 1 wherein said cage includes a frame having spaced vertical end members, said top overhead component being pivotally connected at its rear end portion to said cage frame end members.

6. The vehicle of claim 1 and counterbalancing means associated with said pivot member for biasing movement of said top between its said open and closed positions.

* * * * *